Figure 7:
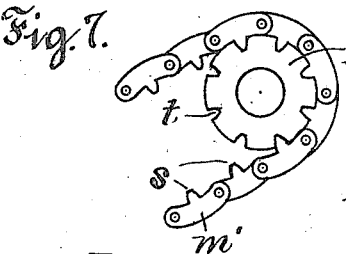

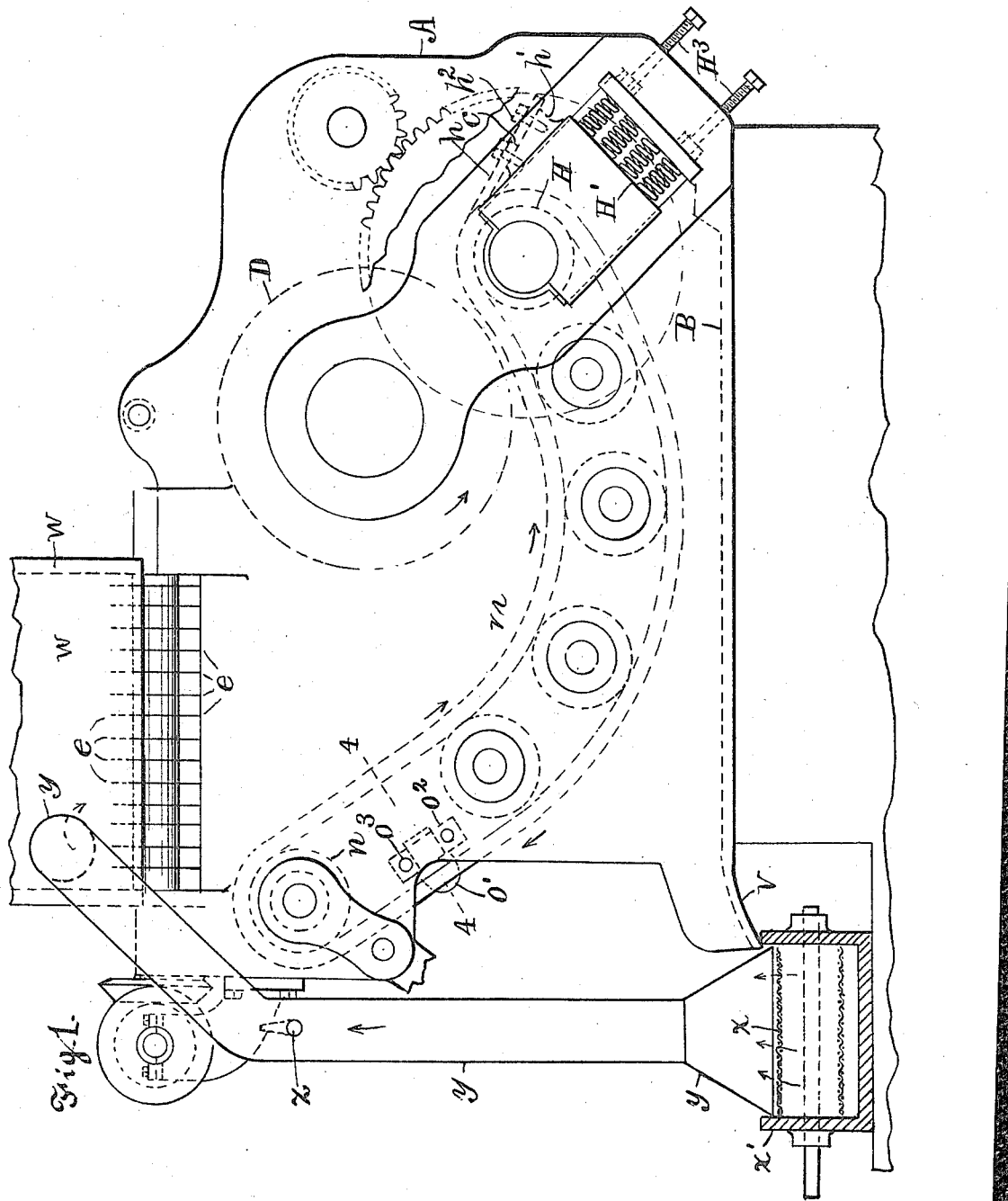

J. W. HYATT.
JUICE EXTRACTING MACHINE.
APPLICATION FILED FEB. 11, 1916.

1,268,247.

Patented June 4, 1918.
2 SHEETS—SHEET 2.

Inventor
John W. Hyatt
per Thomas S. Crane, Atty.

UNITED STATES PATENT OFFICE.

JOHN WESLEY HYATT, OF ORANGE, NEW JERSEY.

JUICE-EXTRACTING MACHINE.

1,268,247.   Specification of Letters Patent.   Patented June 4, 1918.

Application filed February 11, 1916. Serial No. 77,617.

*To all whom it may concern:*

Be it known that I, JOHN W. HYATT, a citizen of the United States, residing at 11 High street, Orange, county of Essex, and State of New Jersey, have invented certain new and useful Improvements in Juice-Extracting Machines, fully described and represented in the following specification and the accompanying drawings, forming a part of the same.

The present invention relates to means for improving the operation of a pervious chain-belt comprising a series of separate, similar, parallel, endless chains when used in combination with a pressing-roll, to express the juice from sugar-cane or similar vegetable substances, and it also provides special means of separating any loose fibers from the juice which has passed through the belt of chains.

Heretofore, the pervious element has been formed of a composite chain consisting of chain-links placed side by side as well as end to end to form a single chain of suitable width, and the vegetable fiber has heretofore shown a tendency to wedge between the adjacent sides of the links of the belt so as to spread its members apart and crowd them with great force against the cheeks of the supporting-frame.

In the present invention, I prevent the accumulation of vegetable matter between the members of the belt, by forming the belt of separate chains wholly independent of one another, with sufficient interspaces for the escape of the juice, so that clearing-blades or any other suitable means may operate between the several chains and remove any fiber or deposit that penetrates the interstices, and thus prevent any accumulation of such matter which would obstruct the escape of the juice, or crowd the chains unduly apart. To drive the chain-belt more positively than heretofore, I form the chain-links each with a tooth upon its inner side and form the supporting-roll or drum with grooves to receive such teeth, so that the teeth operate to feed all the separate chains at the same speed.

To prevent the accumulation of fine fibers in the receptacles or passages for the extracted juice, I discharge such juice upon an endless apron made of pervious material like wire-cloth, so as to form a strainer through which the juice falls freely; while it conducts the fibers to an exhaust-tube by which they are sucked from the apron and discharged into the feeding-space or hopper of the machine, where such fibers mingle with the cane and are subjected again to pressure, which removes the juice therefrom.

Figure 5:
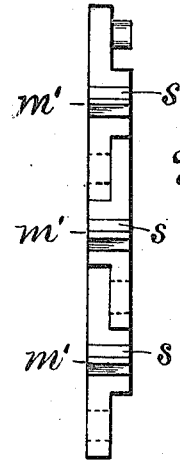
Figure 6:
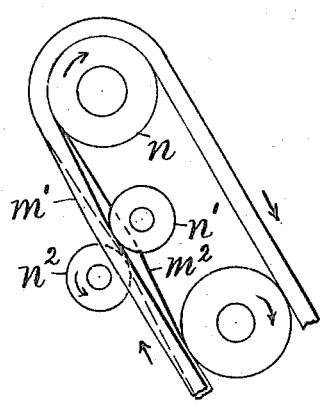
Figure 2:
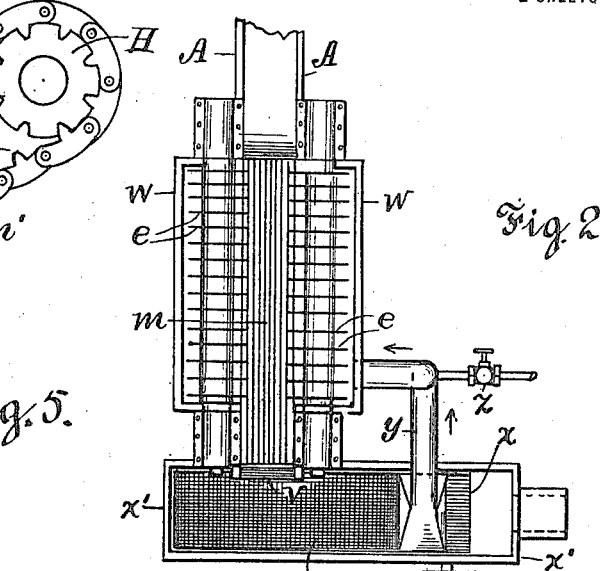
Figure 3:
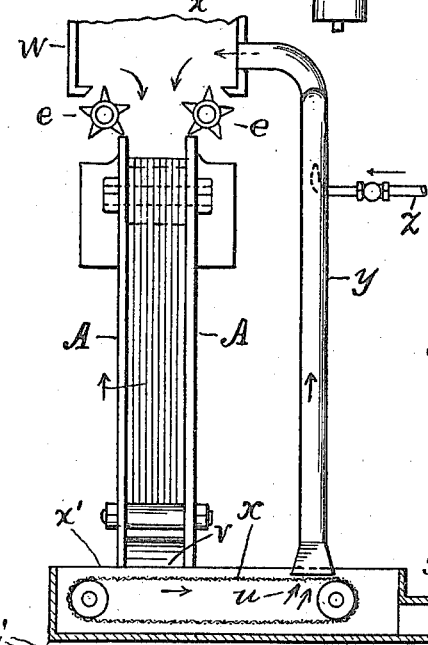
Figure 4:
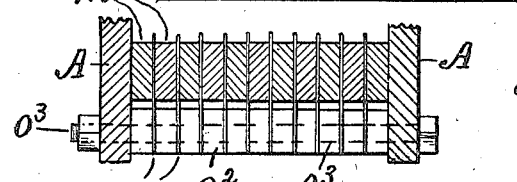

The invention will be understood by reference to the annexed drawing, in which Figure 1 is a side elevation of a juice-extracting machine of the class shown in my prior Patent No. 786,902 dated April 11, 1905; Fig. 2 is a plan of the delivery-end of the machine; Fig. 3 is an elevation of the feeding-end of the machine, with all of the appliances omitted except the rear end of the chain-belt and the clearing-blades; and Fig. 4 is a section through the chain-belt and clearing-blades, taken on line 4—4 in Fig. 1. Fig. 5 shows an edge view of several links forming one of the separate chains; and Fig. 6 is a diagram showing an alternative means of clearing the separate chains from any interposed fibers.

The machine is shown with a casing comprising two upright cheeks A united at the bottom to a bed B which forms a trough to receive the juice.

Between the cheeks are extended the upper or pressing roll D and the lower roll or belt drum H, the chains m passing between the rolls and turning over the drum H at the delivery-end of the machine, and being at the feeding-end of the machine carried around a return-pulley n, so that it moves beneath the feed-wheels e which propel the vegetable substance downward upon the chain, by which it is carried between the rolls to express the juice. The rolls are rotated by suitable gearing.

The belt is made, as shown in Fig. 4, of wholly separate chains with slight interspaces between them for the escape of the juice. Each chain may be made of any suitable form of link, Fig. 5 showing the form which has been used in practice. The plurality of chains forms a belt which just fits between the cheeks, and closes the bottom of the feeding-space.

Two means are shown for clearing the interspaces of the chains, one by means of clearing-blades and the other by pushing the alternate chains out of their normal path, and preferably upon the slack-side of the chain.

A series of clearing-blades $o'$ is shown in Fig. 4 supported upon bolts extended through the cheeks A adjacent to the return-pulley $n$, the blades being extended into the interspaces between the chains, so as to wholly clear such interspaces of all fibrous material or other deposit at each movement of the chains over the return-pulley.

The clearing-blades are shown clamped between spacing-blocks $o^2$ which are traversed by bolts $o^3$ penetrating the blades and blocks, and extended through the cheeks, so as to support the clearing-blades rigidly in the path of the chains. The clearing-blades are shown applied to the spaces between the separate chains upon the return-side of the belt, because no pressure is exerted upon the chains on that side and they therefore move freely past the clearing-blades.

Any deposit between the several chains may also be cleared by forcing alternate chains of the belt in opposite directions for a space equal to their own width, as shown in Fig. 6, where rolls $n'$ and $n^2$ are shown as operating upon the separate chains $m'$ and $m^2$ so as to push alternate chains of the chain-belt in opposite directions, so that when they move back to their normal position side by side, any substance on the adjacent sides of the chains will necessarily be rubbed off.

It is immaterial whether rolls be used to push the chains out of their normal path or sloping guides occupying the same position as the rolls, as both would perform the same function. Such rolls or sloping guides are more durable in practice than the clearing-blades, and I have therefore made a special claim to means for pushing alternate chains out of their normal path.

By making the chain-belt of separate chains, and clearing the interspaces between them at each movement of the chain over the return-pulley, the spaces are kept clear from any obstruction which might obstruct the escape of the juice, or unduly spread certain of the chains apart and thus close the interspaces between others of the chains and prevent the passage of the juice therethrough.

Such spaces are therefore very superior to mere holes extended through blocks or links to permit the escape of fluid, as the interspaces between the separate chains are readily cleaned, whereas the holes in such blocks or links are liable to remain obstructed from the difficulty of cleaning them out.

The separation of the extracted juice from the fibers which pass normally through the interspaces of the chains is effected by discharging the juice, as shown in Fig. 3, through a spout $v$ extended from the trough at the bottom of the casing, upon a wire-cloth apron $x$, sustained upon a pan $x'$ into which the juice falls, and from which it is delivered by a spout $x^2$ to any desired receptacle.

The delivery-end of the apron moves beneath an exhausted pipe $y$ which is extended above the level of the cheeks A and discharges into the feeding-hopper $w$. A funnel upon the bottom of the pipe is fitted over the top side of the apron at one end, and an air-jet $z$ is inserted in the pipe $y$ to exhaust the same, thus forming an ejector which sucks the fibers from the delivery-end of the apron and discharges them into the feeding-space between the cheeks.

It is immaterial into what part of the feeding-space such fibers are delivered to recover the juice which they contain.

The apron is preferably made of wire-cloth or other pervious material to strain the juice rapidly from the fiber which may be carried with it, and any means for thus straining the juice from the fiber may be employed, provided it delivers the fiber to an exhausted pipe by which it may be conveyed into the feeding-space of the machine.

The meshes of the wire-cloth also serve, as is obvious from Fig. 1, where the pan $x'$ is shown in section, to permit the entrance of air beneath the moving cloth to lift the fibers therefrom when the apron passes beneath the exhausted pipe $y$. Such movement of the air through the cloth is indicated by arrows $u$ in Fig. 1.

It is necessary to apply a scraper $h$, as shown in Fig. 1 to the surface of the chain near the point where it passes beneath the pressing-roll D, to clean the pressed cane or bagasse from the surface of the chain; and heretofore such scraper has been held stationary by attachment to the cheeks A of the casing.

To vary the pressure upon the chain and the material which it carries under the roll D, it is necessary to adjust the drum H by means of bearings H' and screws H³ fitted to a housing in the cheeks A, and the adjustment of the drum has heretofore deranged the relation of the stationary scraper to the chain. To avoid such derangement, I make the scraper $h$ adjustable with the bearings H' by securing its ends to lugs $h'$ upon the respective bearings.

The scraper is secured to the lugs by bolts $h^2$ which pass through slots $c$ in the scraper, and it can thus be adjusted for wear when necessary, but when adjusted maintains its relation to the chain-belt and the drum H in any adjustment of the latter.

An important feature of the invention where separate chains are operated over a belt-drum and a return-pulley is the provision of teeth upon the links of the chain and longitudinal grooves in the belt-drum, so that all of the chains may be driven at the same speed and thus carry the cane or other material uniformly to the pressing-roll so as to distribute the pressure uniformly upon such roll.

In the elevation of the machine in Fig. 1, the chain-belt is necessarily shown in dotted lines, and the teeth are not therefore indicated on the chain links, but a separate view is shown in Fig. 7 where the grooved drum is lettered $H^2$, the chain-links $m'$, the teeth upon the chain are marked $s$ and the grooves in the drum are marked $t$.

The drum is shown cylindrical and the inner sides of the chain-links concaved to fit it correspondingly, but links with one edge straight may be used, and the drum made of polygonal shape, the support of the chains under pressure would be the same with either construction.

Having thus set forth the nature of the invention what is claimed herein is:

1. A juice extracting machine having side-cheeks to form a hopper, and a pressing roll rotated in the space between the cheeks, a belt-carrying drum opposed to the pressing roll, a belt carried over the said drum to propel the material beneath the pressing roll and filling the space between the cheeks, such belt being formed of a series of separate parallel endless chains with interspaces between the opposed sides of the chains, and means operating upon the opposed sides of the chains to clear any deposit from the interspaces and thus maintain a constant outlet for the escape of the juice.

2. A juice-extracting machine having a pressing-roll, a belt-carrying drum opposed to the same, a belt formed of a series of separate chains carried over the drum, feeding-devices mounted over the belt, a return-pulley sustaining the belt under such feeding-devices, and a series of clearing-blades sustained adjacent to the return-pulley upon the return-side of the belt and penetrating the interspaces between the separate chains to clear the same, substantially as set forth.

3. A juice-extracting machine having a pressing-roll, a belt-carrying drum opposed to the same, a belt formed of a series of separate chains carried over the drum, and a series of flat clearing-blades sustained in the path of the belt and penetrating the interspaces between the separate chains, with spacing-blocks between the blades, and bolts holding the blocks and the blades rigidly in their working position.

4. A juice extracting machine having side-cheeks to form a hopper and a trough-shaped bed to receive the juice, a pressing roll rotated in the space between the cheeks, a belt-carrying drum opposed to the pressing roll, and an endless permeable chain-belt driven by the said drum, an endless pervious strainer-apron below the level of the said bed, a spout delivering the juice and fiber from the trough of the bed to the said apron, a pan receiving the juice from the apron and delivering it where required, and an exhausted pipe having a funnel applied to the top of the strainer-apron, and a connection from the exhausted pipe to the hopper of the machine, whereby air pressure below the apron lifts up the material strained from the juice by the apron and delivers it into the hopper.

5. A juice-extracting machine having a pressing-belt formed of a series of similar, parallel, endless chains with juice discharging interspaces between the adjacent sides of the chains, and means operating upon the adjacent sides of the chains to clear any deposit from the interspaces, and thus maintain a constant outlet for the escape of the juice.

6. A juice extracting machine having side-cheeks to form a hopper, a pressing roll rotated in the space between the cheeks, a belt-carrying drum opposed to the pressing roll and longitudinally grooved at regular intervals, a chain-belt filling the space between the side-cheeks and formed of a series of separate interspaced chains with the edges of the chains adjacent, and each separate chain having its links provided with teeth adapted to engage the grooves in the said drum, whereby the drum propels all of the separate chains at the same speed.

In testimony whereof I have hereunto set my hand.

JOHN WESLEY HYATT.

Copies of this patent may be obtained for five cents each, by addressing the "Commissioner of Patents, Washington, D. C."